Nov. 9, 1926.
L. F. SHUHA
PERCOLATOR
Filed April 11, 1924
1,606,669
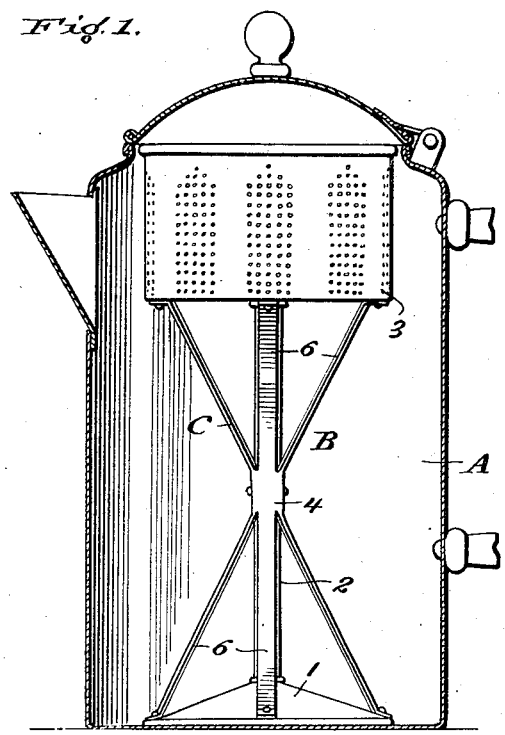
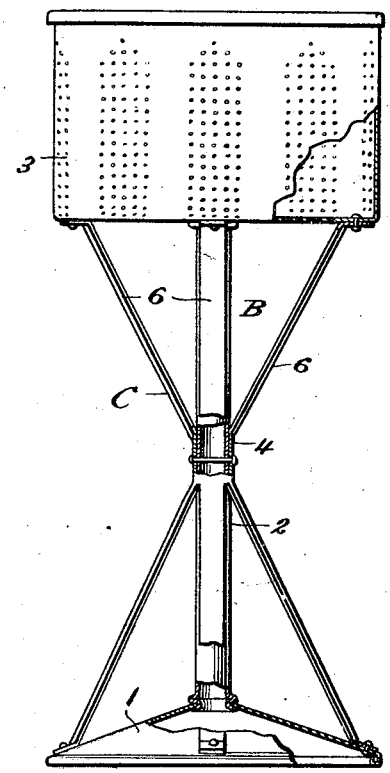
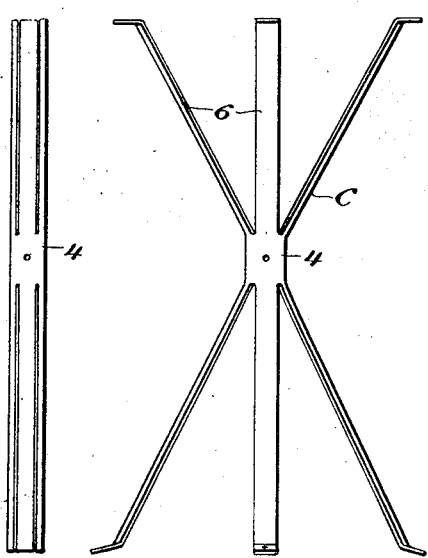
L. F. Shuha
INVENTOR
BY Victor J. Evans
ATTORNEY
WITNESS:

Patented Nov. 9, 1926.

1,606,669

UNITED STATES PATENT OFFICE.

LOUIS F. SHUHA, OF McKEESPORT, PENNSYLVANIA.

PERCOLATOR.

Application filed April 11, 1924. Serial No. 705,876.

This invention relates to improvements in percolators for coffee making and the like, the general object of the invention being to provide a brace for connecting the coffee holding part with the base part so as to lengthen the life of the inner part of the percolator.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a sectional view through a coffee pot showing my invention in use.

Figure 2 is an enlarged view with parts broken away.

Figures 3 and 4 are detail views.

In these views, A indicates the pot and B indicates the percolating device therein which consists of the base 1 and the tube 2 and the perforated coffee holder 3. It is a well known fact that this device soon breaks at the junction of the tube with the base and coffee holder and it is the object of my invention to prevent this by providing a brace C for connecting the three parts together. This brace consists of a tubular central part 4 which is adapted to be fastened to the tube 2 and the diverging parts 6 which are adapted to be connected with the base 1 and the holder 3. Thus the parts are firmly connected together by the brace member C so that there is no danger of them becoming separated. I prefer to form the brace member of a tube which is slotted from the ends towards the middle with the slotted portions bent outwardly to provide the members 6.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a percolator, a brace member comprising a tubular part closely engaging the tube of the percolator and connected therewith and diverging arms at each end of the tubular part, the ends of the arms being connected respectively with the base and the holder of the percolator.

2. In a percolator, a brace member connected with the tube part of the percolator and with the base and holder thereof, said brace consisting of a central tubular part closely engaging the tube of the percolator and connected therewith and diverging members which are connected with the base and with the holder.

3. As a new and improved article of manufacture, a percolator brace comprising a hollow tubular member longitudinally split from both ends for the major portion of its length and at spaced points to provide a central tubular body portion, and relatively bendable arms projecting outwardly from the opposite ends of the body portion and divergently disposed relatively, said body portion being adapted to be secured to the tubular stem of the percolator, and the free ends of said arms being offset and adapted to be secured to the base and upper portion of said percolator for the purpose specified.

In testimony whereof I affix my signature.

LOUIS F. SHUHA.